United States Patent [19]
Yamamoto

[11] Patent Number: 6,032,087
[45] Date of Patent: Feb. 29, 2000

[54] SHIP POSITION CONTROL SYSTEM

[75] Inventor: Shigeru Yamamoto, Yokohama, Japan

[73] Assignee: Nissan Motor Co., Ltd., Kanagawa-ken, Japan

[21] Appl. No.: 09/024,427

[22] Filed: Feb. 17, 1998

[30] Foreign Application Priority Data

Feb. 17, 1997 [JP] Japan .................................. 9-032310

[51] Int. Cl.$^7$ .................................................. G01C 21/10
[52] U.S. Cl. .................................. 701/21; 701/1; 701/7; 340/851; 114/343; 116/265
[58] Field of Search ..................... 701/21, 1, 7; 114/343; 340/851; 116/265

[56] References Cited

U.S. PATENT DOCUMENTS 5,209,682  5/1993  Duning et al. .............................. 440/2
5,916,284  6/1999  Ishihara et al. ........................... 701/21

FOREIGN PATENT DOCUMENTS 8-58696  3/1996  Japan .
8-192794  7/1996  Japan .

*Primary Examiner*—William A. Cuchlinski, Jr.
*Assistant Examiner*—Olga Hernandez
*Attorney, Agent, or Firm*—Foley & Lardner

[57] ABSTRACT

A bowthruster is operated by a control unit with wind direction based on a detection signal from vane-anemometer. A bow in a hull attitude is slightly adjusted so as to direct a bow of the hull to windward. At the same time, a propulsion unit is operated by control unit in accordance with wind strength based on a detection signal from vane-anemometer. A hull position is slightly adjusted such that the hull is moved based on a distance carried away by wind. Rocking of the hull is reduced by always directing the bow to windward and also the hull is stayed at a constant point located directly over shoal of fish or gathering place for fish so as to enable the pleasant fishing. Accordingly, because of good control response and fine ship position adjustment, the hull is positioned quickly in a fishery and then maintained at a predetermined point in the fishery.

6 Claims, 7 Drawing Sheets

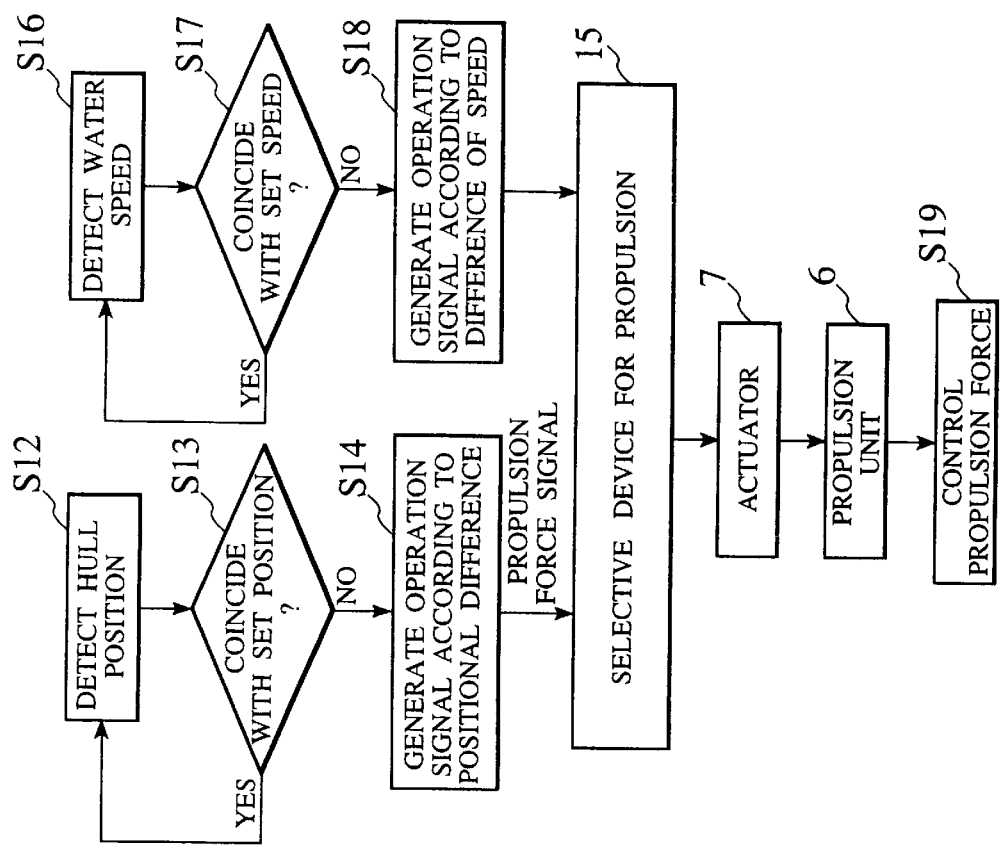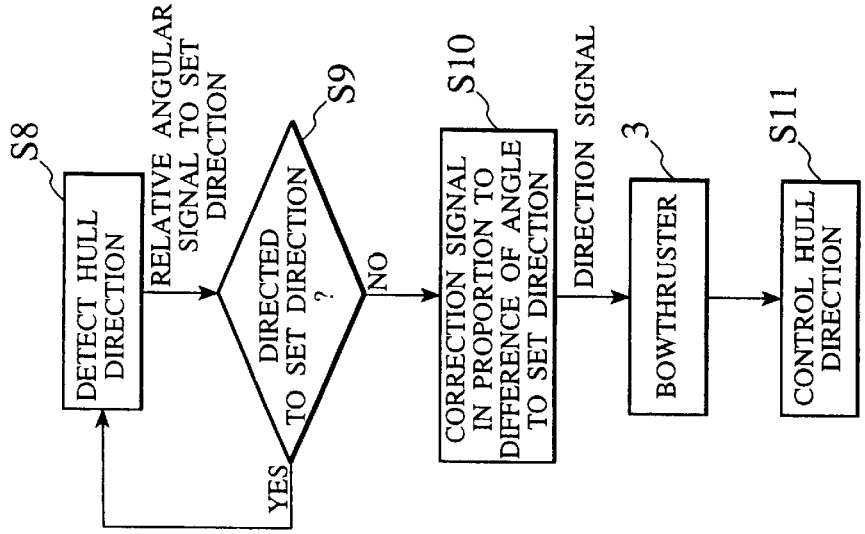

SHIP POSITION CONTROL SYSTEM

The contents of Application No. TOKUGANHEI 9-32310, filed on Feb. 17, 1997 in Japan are hereby incorporated by reference.

BACKGROUND OF THE INVENTION

The present invention relates to a ship position control system for use in a small ship such as a pleasure boat or a fishing boat.

In the first related art (Patent Application Publication (KOKAI) Hei 8-192794), the ship's course is automatically controlled by operating a helm or thruster at a predetermined control ratio according to a ship speed based on respective detection signals from an direction sensor, a position sensor, and a speed sensor.

In the second related art disclosed in Patent Application Publication (KOKAI) Hei 8-58696, a ship keeps a predetermined position, operating two propulsion units in a twin-screw vessel respectively according to a difference between hull positions based on respective detection signals which are output from a direction sensor, a position sensor, a vane-anemometer, and a tidal sensor.

These pleasure boats or fishing boats need to stay at a constant point to provided gratifying fishing.

However, in the first the related art, the hull is not maintained or stayed at a predetermined point of the fishery since a course is controlled only by speed. Meanwhile, in the second related art, a predetermined speed is needed to actuate a rudder effectively since the boat must be returned to a target area by controlling propulsion forces generated by two propulsion units in the two-axle ship. Therefore, a ship position control system in the second related art is not effective for precise ship position control to maintain or stay the boat at a constant point in the fishery. In addition, it does not help but conclude that a time required for ship position correction is prolonged to thus degrade a control response characteristic since the ship position must be corrected by controlling respective propulsion forces generated by the two propulsion units.

SUMMARY OF THE INVENTION

Therefore, it is an object of the present invention to provide a ship position control system which is capable of positioning quickly a hull in a fishery and then maintaining the hull at a predetermined point in the fishery because of good control response and fine ship position adjustment and therefore is suited for a small ship such as a pleasure boat or a fishing boat.

In order to achieve the above object of the present invention, according to a first aspect of the present invention, there is provided a ship position control system comprising:

a wind detector detecting a wind direction and a wind speed;

a propulsion unit propelling a hull at low speed;

a thruster generating lateral thrust of the hull; and a control unit operating the thruster and the propulsion unit according to detection signals output from the detector; wherein the control unit operates the thruster and the propulsion unit on the base of the wind direction and the wind speed so as to maintain the hull in a direction, in which a bow is directed to windward, and in a set position.

In the related art, even if a hull is tried to be kept at a constant point in a fishery with a bow directing to windward, a position of the hull tend to be deviated form the constant point by wind direction change and wind speed.

On the contrary, according to the first aspect of the present invention, a thruster is slightly operated in accordance with the wind direction to adjust ship attitude so as to direct a bow to windward and a propulsion unit is operated in accordance with wind strength to slightly advance a hull by a distance carried away by wind. As a result, rocking of the hull is reduced by always directing the bow to windward and also the hull is stayed at a constant point, and a gratifying fishing is provided.

In addition, since bow directional adjustment caused by thruster operation and hull position adjustment caused by propulsion unit operation are carried out simultaneously, a constant position of the hull is be quickly defined and achieved.

According to a second aspect of the present invention, there is provided a ship position control system comprising:

a direction detector detecting a direction of a hull;

a position detector detecting a position of the hull;

a propulsion unit propelling the hull at low speed;

a thruster generating lateral thrust of the hull; and a control unit operating the thruster and the propulsion unit according to detection signals output from the detectors; wherein the control unit calculates directional difference between the detected direction and a set direction and a positional difference between the detected position and a set position, and operates the thruster and the propulsion unit on the bases of the directional difference and the positional difference so as to maintain the hull in the set direction and the set position.

In the related art, even if a hull is tried to be kept in a constant directional attitude and to stay at a constant point in the predetermined fishery so as to provide pleasure fishing, a position of the hull tends to be deviate from the constant point by wind direction change, wind speed and water flow.

On the contrary, according to the second aspect of the present invention, a position detector and a direction detector quickly determine how a position of a hull is deviated from a set position and where and how a direction of the hull is deviated from a set direction. Then, a control unit executes directional correction by thruster operation according to a directional difference based on a detection signal from a direction detector, and at the same time the control unit executes positional correction by propulsion unit operation according to a positional difference based on a detection signal from the position detector.

As a result, the hull is stayed at a constant point while keeping a constant directional attitude, regardless of carrying way of the hull due to wind and water flow. Therefore, for example, a boat with the control unit is suited for fishing to get fishes which live at particular area on the sea bottom.

In addition, since bow directional adjustment caused by thruster operation and hull position adjustment caused by propulsion unit operation are carried out simultaneously, a constant position of the hull is quickly defined and achieved.

According to a third aspect of the present invention, there is provided a ship position control system comprising:

a direction detector detecting a direction of a hull;

a position detector detecting a position of the hull;

a speed detector detecting a water speed;

a propulsion unit propelling the hull at low speed;

a thruster generating lateral thrust of the hull;

a control unit operating the thruster and the propulsion unit according to detection signals output from the detectors, and a mode selective device setting the control unit in a desired control node; wherein the control unit calculates a first directional difference between the detected direction and a first set direction and a positional difference between the detected position and a first set position, and operates the thruster and the propulsion unit on the bases of the first directional difference and the positional difference so as to maintain the hull in the first set direction and the first set position, when the control unit is set in a first control mode, and the control unit calculates a second directional difference between the detected direction and a second set direction, and operates the thruster and the propulsion unit on the bases of the second directional difference and the detected water speed so as to maintain the hull in the second set direction and second set position, when the control unit is set in a second control mode.

According to the third aspect of the present invention, in a first control mode, a propulsion unit and a thruster are operated by a control unit based on respective detection signals from a direction detector and a position detector. In a second control mode, the propulsion unit and the thruster are operated by the control unit based on respective detection signals from a direction detector and a speed detector. Thus, in the first control mode, the hull is kept at a constant point while keeping a constant directional attitude, regardless of carrying way of the hull due to wind and water flow. In the second control mode, the hull is kept at a constant point while eliminating a positional difference with respect to a water surface caused by water flow.

As a result, a boat with the control unit is suited for fishing to get fishes which live at particular area on the sea bottom, and is suited for so-called troll fishing, in which a hull is floated synchronously with water, to get the other kind of fishes which live in stream of water.

In addition, since bow direction adjustment cased by thruster operation and hull position adjustment caused by propulsion unit operation are carried out simultaneously, a constant position of this hull is quickly defined and achieved.

According to a fourth aspect of the present invention, there is provided a ship position control system comprising:

a wind detector detecting a wind direction and a wind speed;

a direction detector detecting a direction of a hull;

a position detector detecting a position of the hull; and a propulsion unit propelling the hull at low speed;

a thruster generating lateral thrust of the hull;

a control unit operating the thruster and the propulsion unit according to detection signals output from the detectors; and a mode selective device setting the control unit in a desired control mode; wherein the control unit operates the thruster and the propulsion unit on the bases of the wind direction and the wind speed so as to maintain the hull in a direction, in which a bow is directed to windward, and in a direst set position, when the control unit is set in a first control mode, and the control unit calculates a directional difference between the detected direction and a set direction and a positional difference between the detected position and a second set position, and operates the thruster and the propulsion unit on the bases of the directional difference and the positional difference so as to maintain the hull in the set direction and the second set position, when the control unit is set in a second control mode.

According to a fifth aspect of the present invention, there is provided a ship position control system comprising:

a wind detector detecting a wind direction and a wind speed;

a direction detector detecting a direction of a hull;

a speed detector detecting a water speed; and a propulsion unit propelling the hull at low speed;

a thruster generating lateral thrust of the hull;

a control unit operating the thruster and the propulsion unit according to detection signals output from the detectors; and a mode selective device setting the control unit in a desired control mode; wherein the control unit operates the thruster and the propulsion unit on the bases of the wind direction and the wind speed so as to maintain the hull in a direction, in which a bow is directed to windward, and in a first set position, when the control unit is set in a first control mode, and the control unit calculates a directional difference between the detected direction and a set direction, and operates the thruster and the propulsion unit on the bases of the directional difference and the detected water speed so as to maintain the hull in the set directing and a second set position, when the control unit is set in a second control mode.

According to a sixth aspect of the present invention, there is provided a ship position control system comprising:

a wind detector detecting a wind direction and a wind speed;

a direction detector detecting a direction of a hull;

a position detector detecting a position of the hull;

a speed detector detecting a water speed;

a propulsion unit propelling the hull at low speed;

thruster generating lateral thrust of the hull;

control unit operating the thruster and the propulsion unit according to detection signals output from the detectors, and a node selective device setting the control unit in a desired control mode; wherein the control unit calculates a first directional difference between the detected direction and a first set direction and a positional difference between the detected position and a first set position, and operates the thruster and the propulsion unit on the bases of the first directional difference and the positional difference so as to maintain the hull in the first set direction and the first set position, when the control unit is set in a first control mode, the control unit calculates a second directional difference between the detected direction and a second set direction, and operates the thruster and the propulsion unit on the bases of the second directional difference and the detected water speed so as to maintain the hull in the second set direction and a second set position, when the control unit is set in a second control mode, and the control unit operates the thruster and the propulsion unit on the bases of the wind direction and the wind speed so as to maintain the hull in a direction, in which a bow is directed to windward, and in a third set position, when the control unit is set in a third control mode.

According to the above forth, fifth, and sixth aspects of the present invention, the control unit is set in an appropriate control mode according to the target fish of fishing by the mode selective device. Therefore, the hull is kept at a suitable appropriate point in which a desired target fishes live.

BRIEF DESCRIPTION OF THE DRAWINGS

FIGS. 4A and 4B are explanation views illustrating operations of a ship position control system according to second embodiment of the present invention, wherein FIG. 4A illustrates an direction control operation and FIG. 4B illustrates a position control operation;

FIGS. 6A and 6B are explanation views illustrating operations of a ship position control system according to third embodiment of the present invention, wherein FIG. 6A illustrates a direction control operation and FIG. 6B illustrates a position control operation;

DETAILED DESCRIPTION OF THE PREFERRED EMBODIMENTS

Embodiments of the present invention will be explained in detail with reference to accompanying drawings hereinafter.

(First Embodiment)

Figure 1:
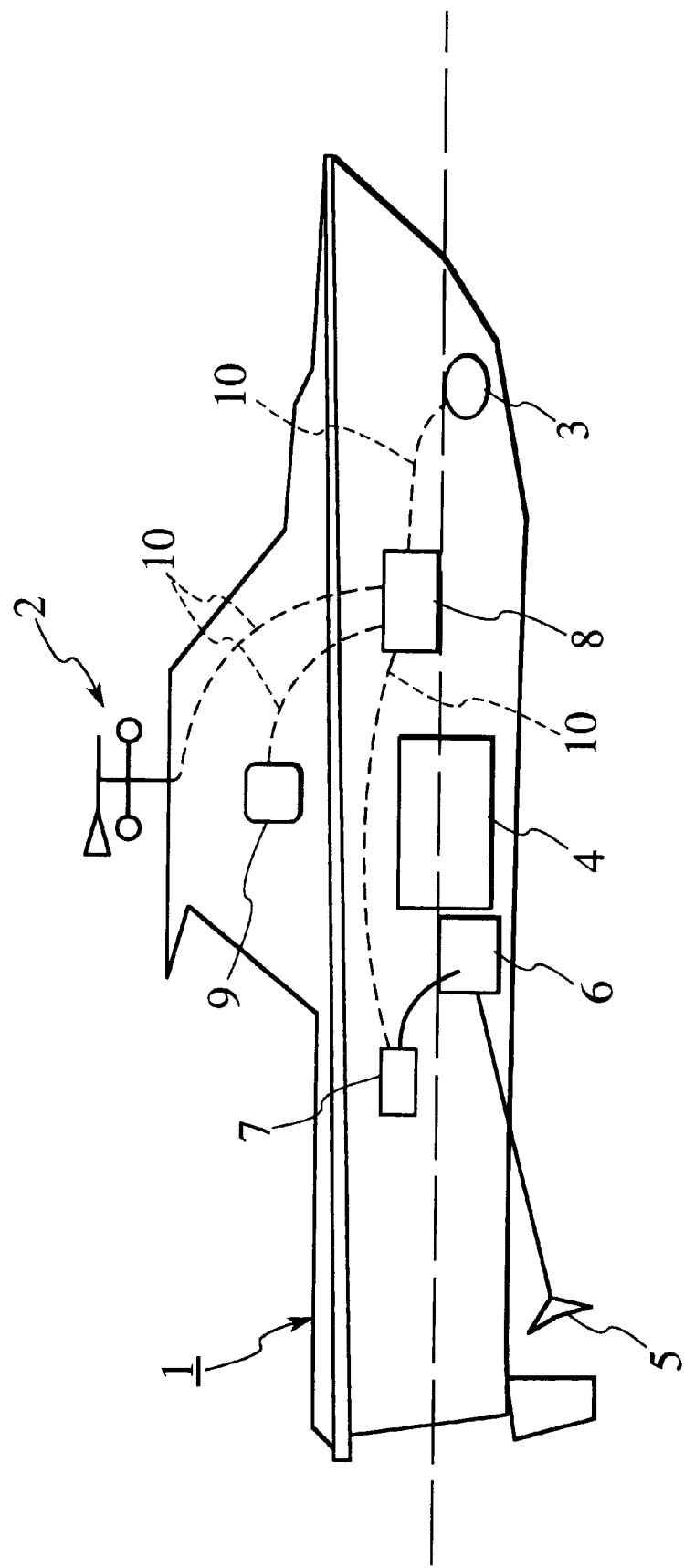
FIG. 1 is a schematic side view showing a fishing boat having a ship position control system according to first embodiment of the present invention.

FIG. 1 is a schematic side view showing a fishing boat having a ship position control system according to first embodiment of the present invention.

The ship position control system comprises a vane-anemometer 2, a bowthruster 3 for acting as thruster, a propulsion unit 6, an actuator 7, a control unit 8, and a display/operation panel 9.

The vane-anemometer 2 is fitted to a substantially central area of a hull 1. The vane-anemometer 2 detects wind direction and wind strength blowing against the hull 1 as electric signals. The bowthruster 3 is fixed to a bow of the hull 1. The propulsion unit 6 is incorporated in a clutch provided in a main engine 4 to generate a forward/backward propulsion force by rotating a propeller 5. The propulsion unit 6 transmits a part of power of the main engine 4 to a propeller 5 side. The actuator 7 operates mechanically the propulsion unit 6. The control unit 8 processes the electric signals from the vane-anemometer 2 to operate and control the bowthruster 3 and the actuator 7. The display/operation panel 9 control operations of overall system and displays operating conditions of the overall system.

More particularly, the vane-anemometer 2, the bowthruster 3, the actuator 7, and the display/operation panel 9 are connected to the control unit 8 by harnesses 10 respectively.

The vane-anemometer 2, as described above, detects wind direction and wind strength blowing against the hull 1 as electric signals and then outputs the detection signals to the control unit 8.

The bowthruster 3 are provided on both sides of the bow of the hull 1 below water surface so as to change a direction of the hull 1 by generating port side and starboard propulsion forces respectively.

The control unit 8 includes a microcomputer as a main unit. The control unit 8 outputs a direction signal, which is generated according to a difference of angle between a wind direction detected by the vane-anemometer 2 and a direction of the hull 1, to the bowthruster 3 so as to control directional correction and magnitude necessary for the hull 1.

At the same time the control unit 8 outputs the electric signal of wind strength detected by the vane-anemometer 2 to the actuator 7 as a propulsion force signal in compliance wit a predetermined program. That is, the control unit 8 operates the propulsion unit 6 to control a rotational speed of the propeller 5 such that the forward propulsion force is supplied to the hull 1 in response to the wind strength so as to advance the hull 1 by a distance carried away by the wind.

Next, an operation of the ship position control system according to the first embodiment of the present invention will be explained with reference to a explanation view in FIG. 2 hereunder.

In pleasure fishing, after the hull 1 has reached the predetermined fishery, a position of the hull 1 is kept in a constant attitude at a desired point located directly over a shoal of fish or a gathering place for fish so as to direct the bow to windward. At that tine, the display/operation panel 9 is operated, the ship position control system is set in an automatic position control system.

According to being set in the automatic position control system, wind direction and wind strength are output from the vane-anemometer 2 to the control unit 8 as the electric signal (step S1, step S5).

When the wind direction is detected by the vane-anemometer 2, the control unit 8 calculates a difference between the direction of the hull 1 (direction of the bow) and the wind direction (step S2). Unless the bow of the hull 1 is properly directed to the windward, a direction signal is output from the control unit 8 to the bowthruster 3 as a correction signal (step S3). The direction signal has a magnitude which is in proportion to a difference of angle between the direction of the wind and the direction of the hull 1.

Then, the bowthruster 3 generates the propulsion force toward one of the port side and starboard directions such that the direction of the hull 1 is controlled to direct properly windward (step S4).

At the same time of direction control of the hull 1, the wind strength is output from the vane-anemometer 2 to the control unit 8 as the electric signal. When the wind strength has been output, the control unit 8 output this electric signal to the actuator 7 as the propulsion force signal in compliance wit the predetermined program (step S6). Therefore, the control unit 8 causes the actuator 7 to operate the propulsion unit 6 to control the rotational speed of the propeller 5 such that the forward propulsion force is supplied to the hull 1 in response to the wind strength so as to advance the hull 1 by a distance carried away by wind (step S7).

Normally, even if the hull 1 tries to stay at a constant point in a fishery with the bow directing to windward, a position of the hull 1 tends to be deviated from the constant point by wind direction change and wind speed. On the contrary, according to the first embodiment of the present invention, the bowthruster 3 is slightly operated in accordance with the wind direction to adjust ship attitude (direction) so as to direct the bow to windward and the propulsion unit 6 is operated in accordance with wind strength to slightly advance the hull 1 by a distance carried away by wind. As a result, rocking of the hull 1 is reduced by always directing the bow to windward and also the hull 1 is stayed at a constant point located directly over a shoal of fish or a gathering place for fish, and pleasant fishing is provided.

In addition, as described above, since direction adjustment of the bow caused by operation of the bowthruster 3 and position adjustment of the hull 1 caused by operation of the propulsion unit 6 are carried out simultaneously, the constant position of the hull 1 is quickly defined and achieved.

(Second Embodiment)

Figure 3:
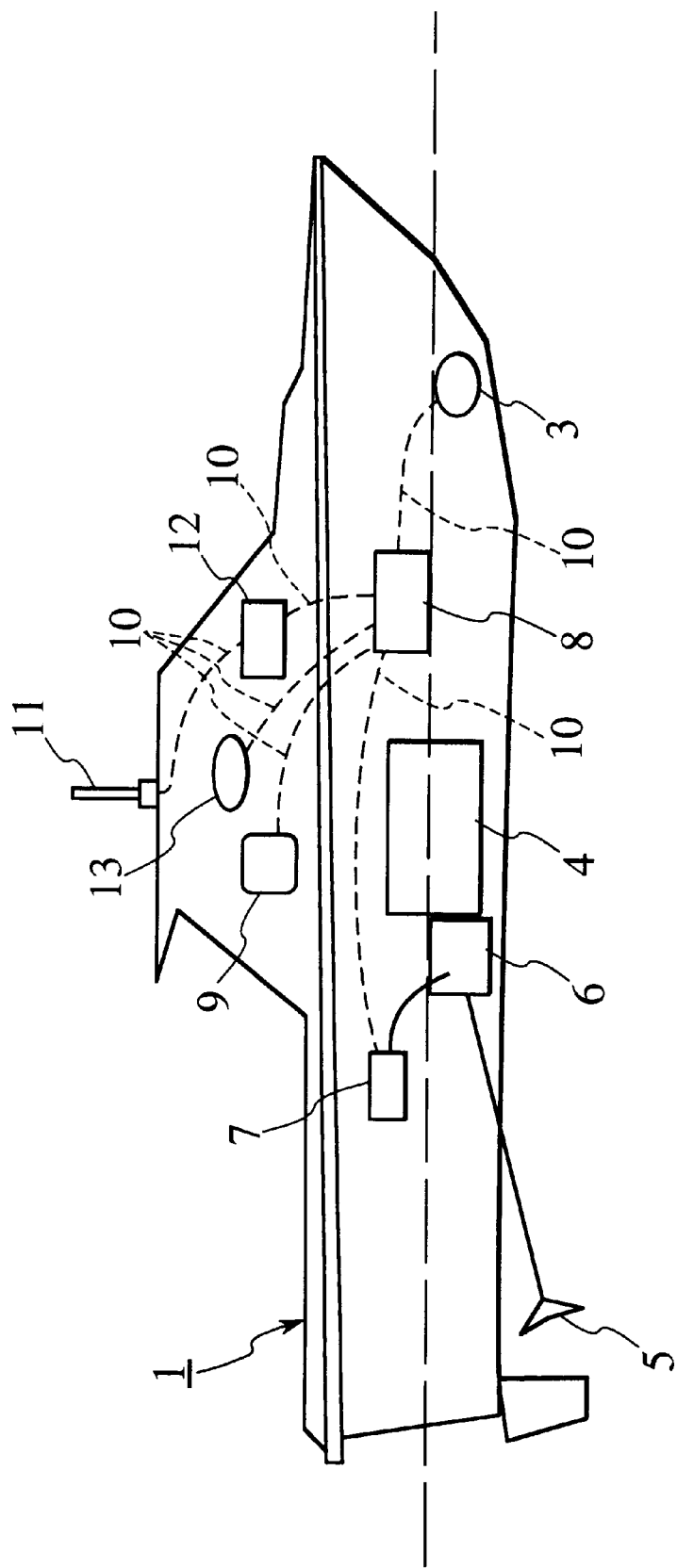
FIG. 3 is a schematic side view showing a fishing boat having another ship position control system according to second embodiment of the present invention.

FIG. 3 is a schematic side view showing a fishing boat having another ship position control system according to a second embodiment of the present invention. In the second embodiment, the ship position is controlled by detecting the absolute position of the hull 1 on the earth and the direction of the bow.

A GPS (Global Positioning System) antenna 11 serving as position detector for the hull 1 is fitted to a substantially central portion of the hull 1. A GPS signal is input into a GPS receiver 12 via the harness 10 as an absolute position information on the earth. The GPS signal is supplied from the GPS receiver 12 to the control unit 8 via the harness 10.

In addition, a direction sensor 13 such as a magnetic compass, a gyro compass, etc. is provided on the hull 1. The direction sensor 13 measures direction of the hull 1 through 360 degrees. The direction sensor 13 detects direction of the hull 1 on the earth as the electric signal. This direction signal is input into the control unit 8 via the harness 10.

Like the first embodiment, based on a position detection signal detected by the GPS antenna 11 and the GPS receiver 12 and a direction signal detected by the direction sensor 13, the control unit 8 causes the bowthruster 3 and the propulsion unit 6 to operate so as to control a direction of the hull 1.

Subsequently, an operation of the ship position control system according to the second embodiment of the present invention will be explained with reference to explanation views in FIGS. 4A and 4B hereunder.

In pleasure fishing, after the hull 1 has reached the predetermined fishery, a position of the hull 1 is kept in a constant attitude at a desired point located directly over a shoal of fish or a gathering place for fish so as to direct the bow to windward. At that time, the display/operation panel 9 is operated, the ship position control system is set in an automatic position control system. Then direction and position information of the hull 1 are input into the control unit 8.

The direction sensor 13 detects a direction of the hull 1 as a relative angular signal with respect to a set value. This relative angular signal is converted into an electric signal and then output to the control unit 8 (step S8).

Figure 4A:
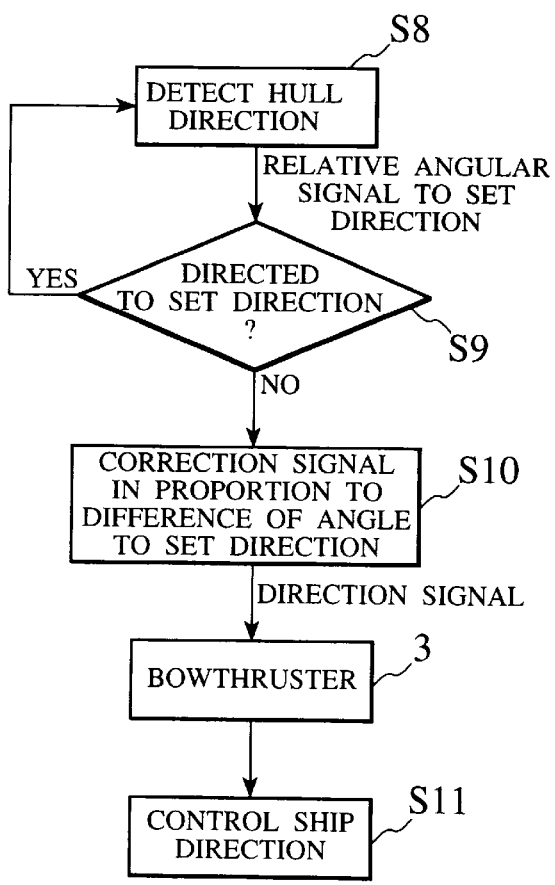
Figure 4B:
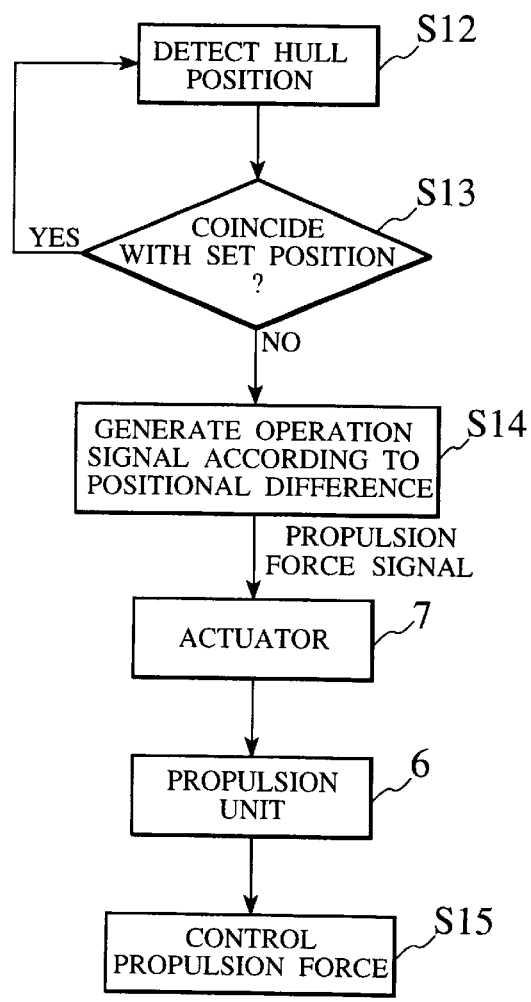

When the relative angular signal is input as the electric signal, the control unit 8 executes comparison to determine whether or not a difference has occurred between a set direction of the hull 1 and the detected direction (step S9), as shown in FIG. 4A. If the direction of the bow is deviated from the set direction caused by wind direction, wind speed and water flow, the direction signal is output to the bowthruster 3 as the correction signal (step S10). The direction signal has a magnitude which is in proportion to a difference of angle.

Then, the bowthruster 3 generates a propulsion force towards either the port side direction or the starboard direction to execute direction control such that the direction of the hull 1 is directed to the set direction (step S11).

The absolute position of the hull 1 on the earth is always measured by the GPS antenna 11 and the GPS receiver 12 simultaneously with this direction control of the hull 1. For this reason, when the GPS signal is input into the control unit 8 (step S12), the control unit 8 calculates a positional difference between the detected position and the set position of the hull 1, and the control unit 8 determines whether or not the positional difference is occurred (step S13), as shown in FIG. 4B. If the hull 1 is shifted from the set position caused by wind direction, wind speed and water flow, the control unit 8 outputs an operation signal to the actuator 7 in response to an amount of the shift (step S14). Then, the actuator 7 operates the propulsion unit 6 to control the rotational speed of the propeller 5 such that the hull 1 is moved forward or backward by the shifted distance to the maintained at the set position (step S15).

In the related art, even if the hull 1 is tried to be kept at a constant directional attitude and to stay at a constant point according to the ecology of the target fish irrespective of wind direction, wind speed and water flow, the direction and the position of the hull 1 tend to be shifted due to wind direction, wind speed and water flow. On the other hand, according to the second embodiment of the present invention, directional attitude of the hull 1 is adjusted by slightly operating the bowthruster 3 based on operation of directional detection by the direction sensor 13 so as to always direct a bow to a set direction, and also forward/backward movement of the hull 1 is minutely adjusted by slightly operating the propulsion unit 6 based on the position detection operation of the GPS antenna 11 and the GPS receiver 12. An amount of the forward/backward movement is set so as to be substantially equal to a distance carried away by wind and water flow. As a result, regardless of carrying way of the hull 1 caused by wind and water flow, the hull 1 stays at the constant point while keeping the constant directional attitude. Therefore, for example, the hull 1 is suited for fishing to get fishes which lives at particular area on sea bottom.

Similarly, in the second embodiment, since direction adjustment of the bow caused by operation of the bowthruster 3 and position adjustment of the hull 1 caused by operation of the propulsion unit 6 are carried out simultaneously, the constant position of the hull 1 is quickly defined and obtained.

(Third Embodiment)

Figure 5:
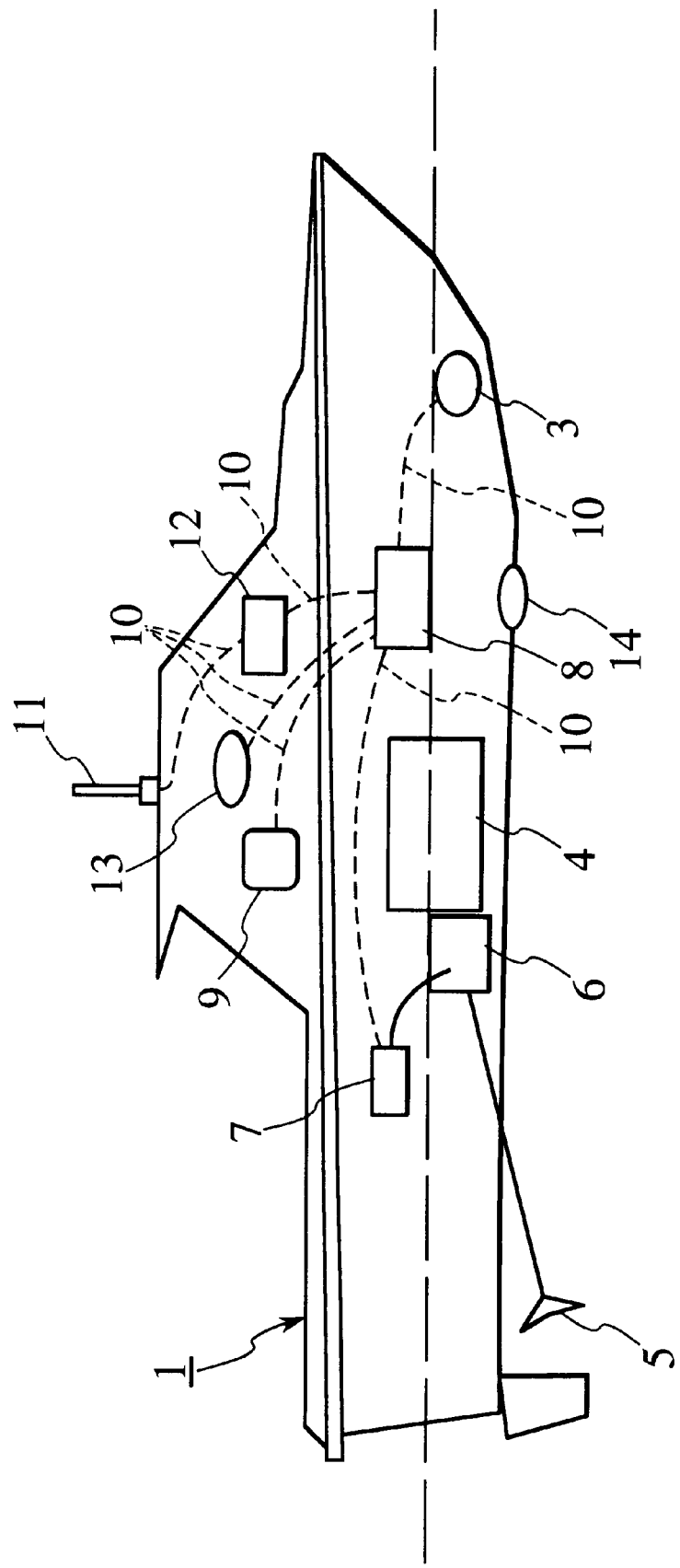
FIG. 5 is a schematic side view showing a fishing boat having still another ship position control system according to third embodiment of the present invention.

FIG. 5 is a schematic side view showing a fishing boat having still another ship position control system according to a third embodiment of the present invention. In this third embodiment, in a water speed sensor 14 is provided to the hull 1 below water surface. The water speed sensor 14 detects a water speed of the hull 1 as an electric signal and then output to the control unit 8 via the harness 10. The control unit 8 controls and operates the propulsion unit 6 according to the water speed.

The display/operation panel 9, as a mode selective device, receives a desired control mode manually or automatically.

The control unit 8 includes a selective device for propulsion 15 (see FIG. 6B). The display/operation panel 9 sets the selective device 15 in the desired control mode.

According to the operation of the display/operation panel 9, the control unit 8 is set in a first control mode or second control mode by display/operation panel 9. When the control unit is set in the first control mode, the propulsion unit 5 is controlled based on detection operation of the position detector 11, 12. When the control unit is set in the second control mode, the propulsion unit 6 is controlled based on detection operation of the water speed sensor 14.

According to the configuration of the third embodiment of the present invention, as shown in explanation views in FIGS. 6A and 6B, direction correction control by virtue of operation control of the bowthruster 3 based on the detected result of the direction sensor 13 and position correction control by virtue of operation control of the propulsion unit 6 based on the detected result of the GPS antenna 11 and the GPS receiver 12 are quite similar to those in the above second embodiment shown in FIGS. 3 and 4.

Namely, when the control nit 8 is set in the first control mode, the bowthruster 3 is controlled based on detection operation of the direction sensor 13 (steps S8, S9, S10, and S11), and the propulsion unit 6 is controlled based on detection operation of the GPS antenna 11 and the GPS receiver 12 (steps S12, S13, S14, and S19).

When the control unit 6 is set in the second control mode by operating the display/operation panel 9, the propulsion unit 6 is controlled based on detection operation of the water speed sensor 14, the water speed of the hull 1 is detected by the water speed sensor 14 as an electric signal, and then this detected signal is input into the control unit 8 (step S16).

In the control unit 8, it is then determined whether or not the hull 1 is kept at the location on water surface at the water speed which is set previously (step S17). In the event that an actual water speed is shifted from the set water speed, the control unit 8 outputs an operation signal to the actuator 7 in accordance with an amount of the shift in the water speed (step S18). The actuator 7 operates the propulsion unit 6 to control the rotational speed of he propeller 5 such that the forward speed or the backward speed of the hull 1 is adjusted by the amount of the shift in the water speed to maintain the hull 1 at the set position on water surface (step S19).

In addition, in the second control mode, the bowthruster 3 is controlled based on detection operation of the direction sensor 13 (steps S8, S9, S10 and S11), like in the first control mode.

As a consequence, according to the third embodiment of the present invention, when a control system of the propulsion unit 6 is in a control system based on a detection operation of the water speed sensor 14 (the control unit 8 is set in the second mode), directional attitude of the hull 1 is maintained in the constant directional attitude which has been set previously without a difference in position from water surface due to water flow. Therefore, the hull 1 is suited for so-called troll fishing, in which the hull 1 is floated synchronously with the water flow and a positional difference between the hull 1 and water surface due to the water flow is eliminated, to get fishes which live in stream of the water flow.

Figure 2:
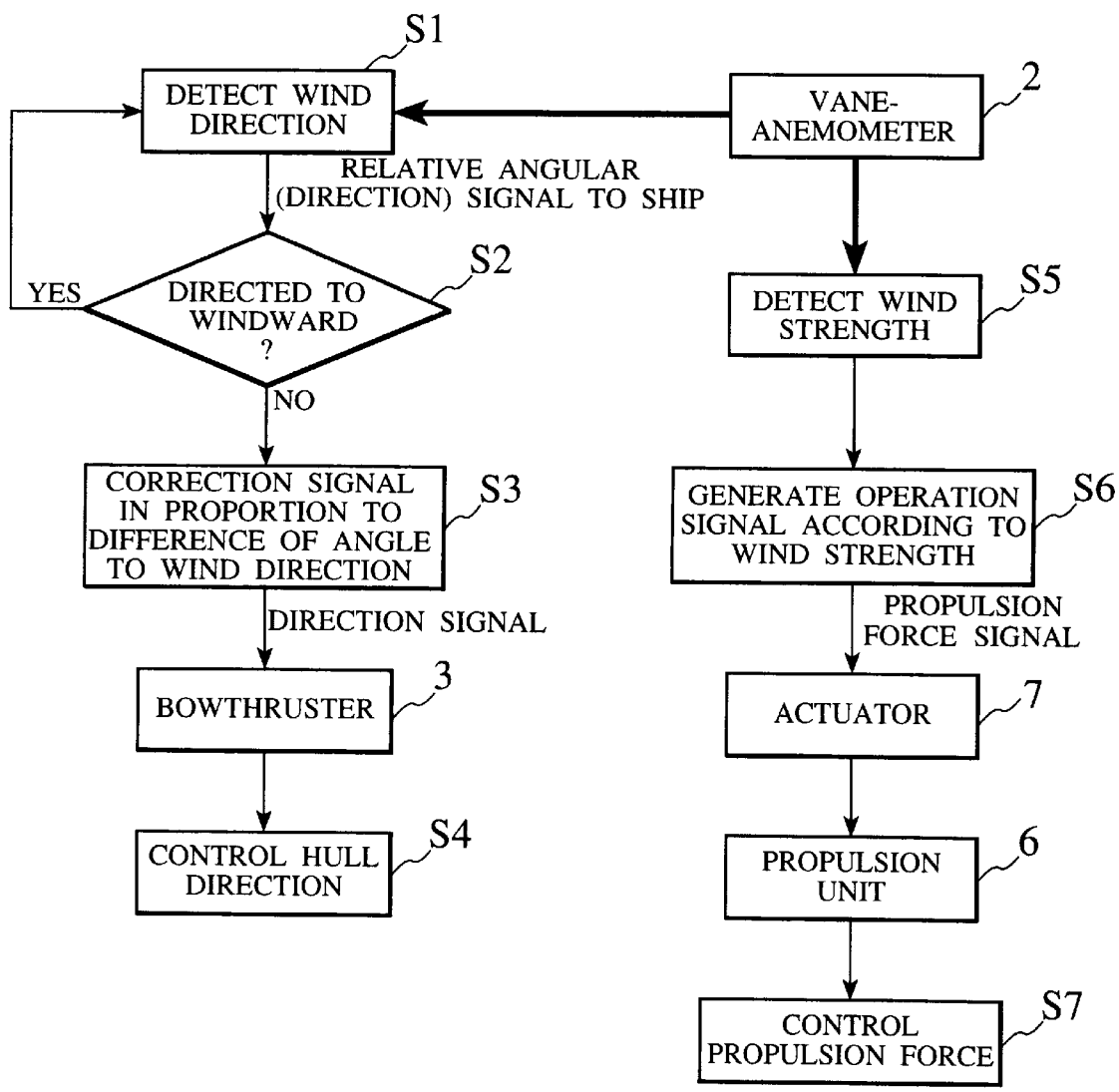
FIG. 2 is a explanation view illustrating an operation of a ship position control system according to first embodiment of the present invention.
Figure 7:
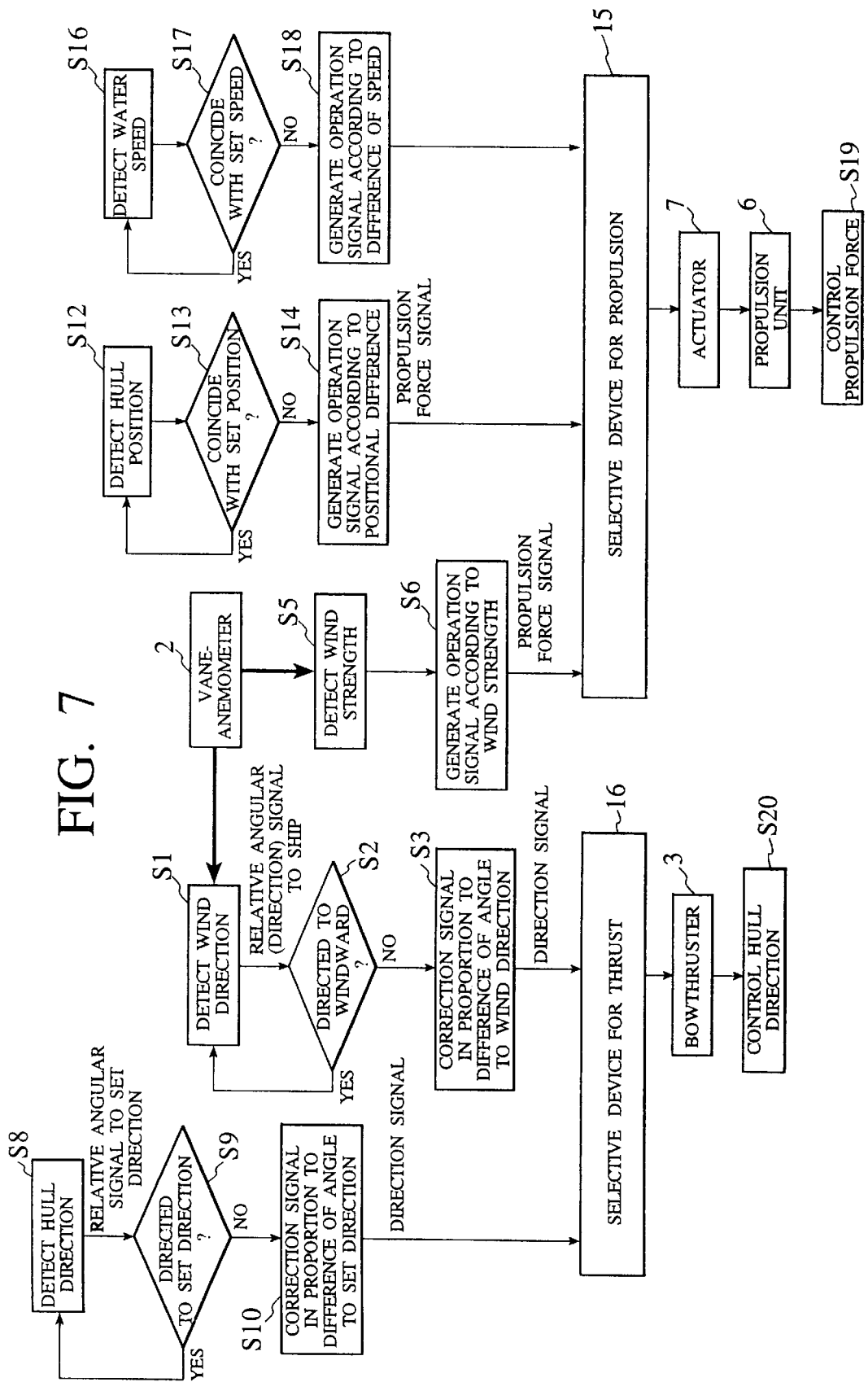
FIG. 7 is explanation view illustrating a operation of a ship position control system according to the other embodiment of the present invention.

The configuration of the ship position control system based on detection operation of the vane-anemometer 2 in the first embodiment shown in FIGS. 1 and 2 may be combined with the second embodiment shown in FIGS. 3 and 4 and the third embodiment shown in FIGS. 5 and 6, and the ship position control system based on detection operation of the vane-anemometer 2 (a third control mode) may be set selectively by operating the display/operation panel 9 like the first and second control mode (See FIG. 7).

In this embodiment, the control unit includes a selective device for propulsion 15 and a selective device for thrust 16. The selective device for propulsion 15 is responsive to the propulsion signals generated in steps S6 and S14 and the operation signal generated in step S18. The actuator 7 operates the propulsion unit 6 to control the rotational speed of the propeller 5 such that the hull 1 is moved forward or backward a desired distance (step S19). The selective device for thrust 16 is responsive to the direction signals generated in steps S3 and S10. The bowthruster 3 generates a propulsion force towards either the portside direction or the starboard direction to execute direction control such that the direction of the hull 1 i s directed to a desired (step S20).

According this structure, the control unit is set in an appropriate control mode according to the target fish of fishing. Therefore, the hull 1 stays at a suitable appropriate point in which desired target fishes live.

What is claimed is:

1. A ship position control system comprising:

a direction detector detecting a direction of a hull;

a position detector detecting a position of the hull;

a propulsion unit driving the hull at low speed;

a thruster generating lateral thrust to the hull; and a control unit operating the thruster and the propulsion unit with the detectors signals; wherein the control unit calculates a directional difference between the detected direction and a set direction and a positional difference between the detected position and a set position, and operates the thruster and the propulsion unit with said difference to maintain the hull is the set direction and the set position.

2. A ship position control system comprising:

a direction detector detecting a direction of a hull;

a position detector detecting a position of the hull;

a speed detector detecting a water speed;

a propulsion unit driving the hull at low speed;

a thruster generating lateral thrust to the hull;

a control unit operating the thruster and the propulsion unit with said detectors signals, and a mode selective device setting the control unit in a desired control mode; wherein the control unit calculates a first directional difference between the detected direction and a first set direction and a positional difference between the detected position and a first set position, and operates the thruster and the propulsion unit on the bases of the first directional difference and the positional difference so as to maintain the hull in the first set direction and the first set position, when the control unit is set in a first control mode, and the control unit calculates a second directional difference between the detected direction and a second set direction, and operates the thruster and the propulsion unit on the bases of the second directional difference and the detected water speed so as to maintain the hull in the second set direction and a second set position, when the control unit is set in a second control mode.

3. A ship position control system according to claim 2, further comprising:

a wind detector detecting a wind direction and a wind speed; wherein the control unit operates the thruster and the propulsion unit with the wind direction and the wind speed to maintain a bow in the hull to windward and in a third set position, when the control unit is set in a third control mode.

4. A ship position control system comprising:

a wind detector detecting wind direction and speed;

a propulsion unit moving the ship at low speed;

a thruster generating lateral thrust to the ship; and a control unit operating the thruster and the propulsion unit with the detector signal to maintain the ship's bow to windward and set position.

5. A ship position control system according to claim 4, further comprising:

a direction detector detecting a direction of the hull;

a position detector detecting a position of the hull; and a mode selective device setting the control unit in a desired control mode; wherein the control unit operates the thruster and the propulsion unit with the wind direction and the wind speed to maintain the direction of a bow in the hull to windward and in a first set position, when the control unit is set in first control mode, and the control unit calculates a directional difference between the detected direction and a set direction and a positional difference between the detected position and a second set position, and operates the thruster and the propulsion unit with said differences to maintain the hull in the set direction and the second set position, when the control unit is set in a second control mode.

6. A ship position control system according to claim 4, further comprising:

a direction detector detecting a direction of the hull;

a speed detector detecting a water speed; and a mode selective device setting the control unit in a desired control mode; wherein the control unit operates the thruster and the propulsion unit with the wind direction and speed to maintain the direction of a bow to windward and in a first set position, when the control unit is set in a first control mode, and the control unit calculates a directional difference between the detected direction and a set direction, and operates the thruster and the propulsion unit with the difference and the detected water speed to maintain the hull in the set direction and a second set position, when the control unit is set in a second control mode.

* * * * *